United States Patent [19]

Rostowski et al.

[11] Patent Number: 5,031,752
[45] Date of Patent: Jul. 16, 1991

[54] CURVABLE CHAIN SCRAPER CONVEYOR

[75] Inventors: Teja Rostowski, Sbr. Bischmisheim; Hajduk-Veljkovic, Saarbrücken; Ludwig Schlosser, Ingbert, all of Fed. Rep. of Germany

[73] Assignee: Untertage Maschinenfabrik Dudweiler GmbH, Dudweiler, Fed. Rep. of Germany

[21] Appl. No.: 484,271

[22] Filed: Feb. 26, 1990

[30] Foreign Application Priority Data

Mar. 21, 1989 [DE] Fed. Rep. of Germany ....... 3909309

[51] Int. Cl.$^5$ .............................................. B65G 19/28
[52] U.S. Cl. .................................. 198/735.6; 198/861.2
[58] Field of Search ..................... 198/303, 304, 735.6, 198/861.2

[56] References Cited

U.S. PATENT DOCUMENTS

| 2,674,364 | 4/1954 | Cartlidge | 198/303 |
| 2,776,040 | 1/1957 | Snyder | 198/303 |
| 2,850,147 | 9/1958 | Hill | 198/109 |
| 2,890,788 | 6/1959 | Hill | 198/303 |
| 3,228,516 | 1/1966 | Sheehan | 198/303 |

FOREIGN PATENT DOCUMENTS

| 961875 | 4/1957 | Fed. Rep. of Germany ... 198/861.2 |
| 1278380 | 10/1968 | Fed. Rep. of Germany . |
| 2405435 | 6/1974 | Fed. Rep. of Germany . |
| 3130796 | 1/1983 | Fed. Rep. of Germany . |
| 3241129 | 7/1984 | Fed. Rep. of Germany . |
| 3339404 | 8/1984 | Fed. Rep. of Germany . |
| 3705898 | 11/1987 | Fed. Rep. of Germany . |
| 3627897 | 4/1988 | Fed. Rep. of Germany . |
| 3727272 | 10/1989 | Fed. Rep. of Germany . |
| 1570042 | 7/1969 | France . |

OTHER PUBLICATIONS

Search Report (German)-Sep. 27, 1989.
Search Report (Germany)-Oct. 2, 1989.

Primary Examiner—Joseph E. Valenza
Attorney, Agent, or Firm—Body, Vickers & Daniels

[57] ABSTRACT

A chain scraper conveyor has a conveyor line of linked segments so as to be curvable. A scraper chain runs in a conveying channel through the conveyor line. The scraper chain turns around chain drums in machine frames at the ends of the line, these being drivable to circulate the scraper chain and/or longitudinally adjustable to tension it. The conveyor has wheels so as to be bodily movable, e.g. by an integral caterpillar-track drive at one end, and for this reason includes a flexible tension element, preferably a round-link chain, that extends along the conveyor line under the channel and is fixed at its ends. The tension chain has lateral freedom relative to the segments, limited by side abutments. At curves (A, B) it can take up a substantially chordal relation to the center line of the conveyor so as to reduce stress on the scraper chain and the consequent tendency of the line to straighten out when being driven.

22 Claims, 3 Drawing Sheets

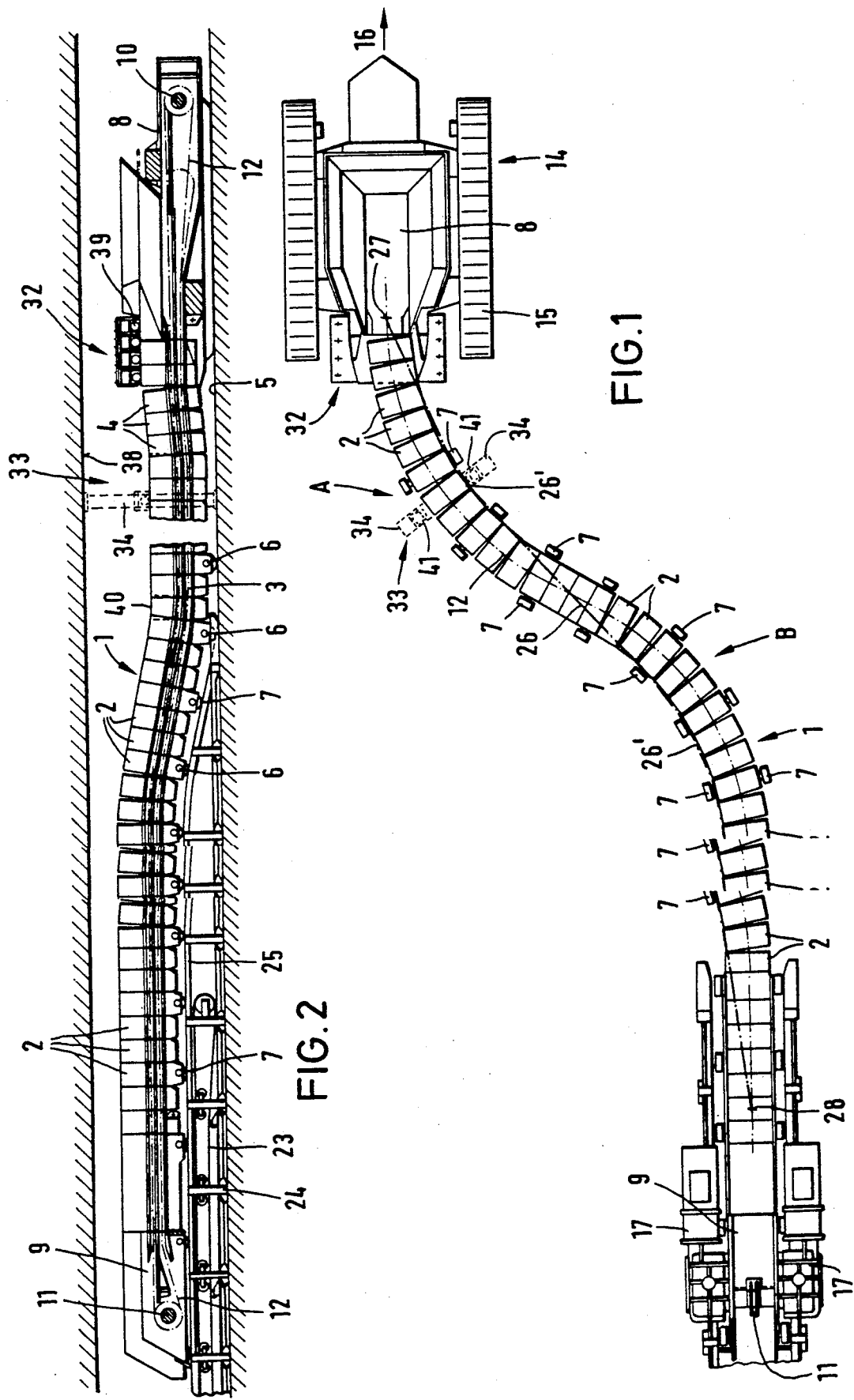

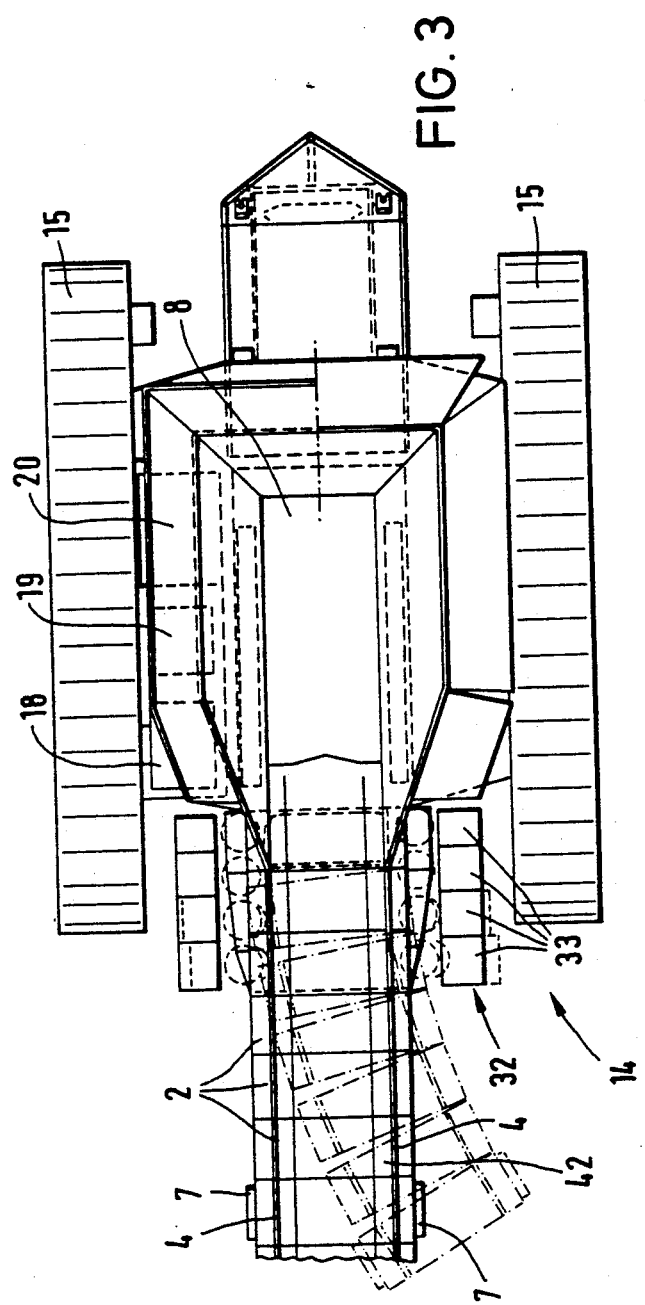
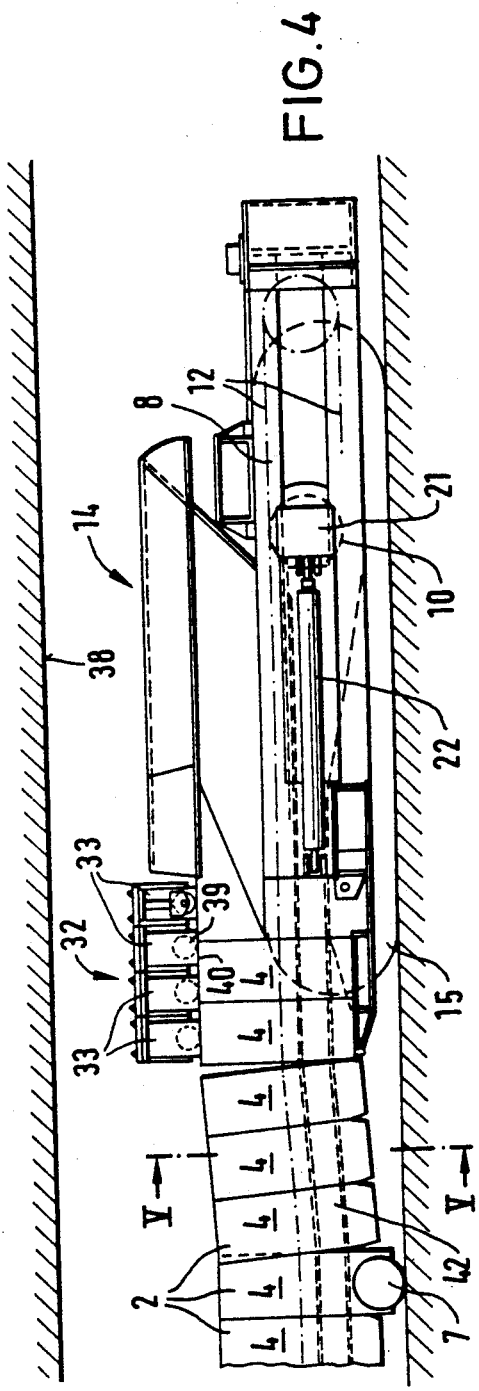

CURVABLE CHAIN SCRAPER CONVEYOR

INVENTION

The invention relates to a curvable chain scraper conveyor which is bodily displaceable longitudinally, whose conveying line forming the conveying run or channel consists of segments connected in pivotably moveable and tension-resistant manner, and which comprises typically at each of its ends a machine frame with a chain drum or the like, one for driving and one for turning round the scraper chain.

BACKGROUND OF THE INVENTION

Curve conveyors constructed as chain scraper conveyors, capable of shifting in their longitudinal direction e.g. by being towed by a winning machine situated at the head and equipped with crawler tracks, are known in various constructional forms (DE-OS 37 27 272, DE-PS 32 41 129, DE-OS 33 39 404). Such self-moving curve conveyors are used e.g. in room and pillar retreating working or under similar conditions.

In curve chain scraper conveyors, the actual conveying line consists of a plurality of short conveyor segments (providing conveyor channel lengths or run sections) which are connected, leaving clearance adequate for curve formation, by means of screw bolts or other connecting elements in a tension-resistant but articulated manner. The length of the conveyor segments and the amount of axial freedom at the connection zones determine the curvability of the conveyor, i.e. the smallest possible curve radius of the conveyor. When travelling along a curved course, the channel joints open at the outer side of the curve. This involves increasing the central length of the conveyor line. This change in length must be permitted by the scraper chain, which for this reason is adjustable in its effective length and tension by means of a loading device. If the loading device used is e.g a hydraulic cylinder device associated with a turn-round drum for the scraper chain, this device must be constructed so that the cylinders can manage the excess pressure when curves are formed and the conveyor line is correspondingly altered in length. Moreover the conveyor segment butt ends are pressed against one another by the preloading of the scraper chain, at both sides when the course of the conveyor is straight, but only at the inner side of the curve in curved regions. The greater the preloading of the scraper chain, the greater the forces and restoring moments tending to return the conveying line to a straight course again.

When the conveyor is moved bodily in the longitudinal direction e.g. by crawler track running gear at its head end, or by a winch or the like, the entrainment of the conveying line is effected on the one hand by the friction of the conveyed material in the conveyor run and on the other hand in the form of thrust via the scraper chain band circulating about the return point or turn-round point at the rear machine frame. This means that when the curve conveyor is displaced during conveying work the scraper chain is additionally loaded by the high towing forces. These forces are also transmitted via any chain preloading device, so that the device has to be made substantially stronger. In the stationary state of the conveyor the preloading cylinder has then to be switched back to a lower pressure level, to avoid high wear caused by conveying with excessively strongly preloaded scraper chains.

SUMMARY OF THE INVENTION

The object of the present invention is to construct a curvable conveyor of the type specified, intended preferably for mining use, in which when displacement of the conveyor occurs the scraper chain and any tensioning device thereof are relieved of these excessively variable forces and the conveyor is better stabilised in whatever course it takes, i.e. restoring forces resulting from the loading of the scraper chain are of lesser effect.

According to the invention, this is achieved by providing a tension element which extends along the length of the conveying line, is coupled inn force-transmitting manner to the two end regions of the conveyor, and which is so constructed as to be movable relatively to the conveying line in the transverse direction thereof to an extent limited by lateral abutments, so that in curved regions of the conveying line it can move to the inner side of the curve, preferably so as to extend at least approximately as a tangent to the inner curve arc. Preferably the flexible tension element consists of a chain, especially a round-link chain, although ropes and the like may be used instead. The lateral freedom of movement is preferably over substantially the lateral width of the conveyor line itself.

This tension or drawing element is arranged so that when the curve conveyor is advanced the pulling forces required for overcoming resistance to travel are transmitted, relieving the scraper chain, to the rear end of the conveyor where they act as thrust forces. Thus it is possible both to pull and push the conveyor line when advancing. The interposing of the tension element, transmitting pulling forces, also relieves the scraper chain band of such pulling forces at least to a substantial extent. Correspondingly a further result is that the chain drive and return, e.g. chain starwheels and their associated chain drum bearings, are also relieved of load. Any chain tensioning device ma also be relieved of these forces. The curve conveyor can thus be displaced without it being absolutely necessary to halt conveying work to do so. The arrangement may also advantageously be made such that the curve conveyor can be displaced longitudinally in either direction.

Since, when the conveyor line is following a curved course, the tension element can at least approximately set itself on or near the tangential line relatively to the inner arc of the curve (in other words, on to a chord of the arc formed by the conveyor axis), the pulling forces introduced into the tension element tend to eliminate the restoring forces which tend to re-adjust the curve conveyor back on to the straight course, i.e. the curve conveyor is stabilised in its existing curved disposition.

It is preferred to attach or anchor the tension element at its ends to the relevant machine frame of the curve conveyor. A variable length or re-tensionable anchoring system is not always necessary, but may be provided if desired. The length of the tension element between its fixed ends is adapted to the length of the curve conveyor and the size of the attainable curve radii. The length need be no greater than or not substantially greater than the length of the conveying line bridged by the tension element when situated on a straight course with the channel sections fully butting against one another. The arrangement is also advantageously such that the tension element is spaced below the conveying channel or run in the conveying line.

In a preferred version, certain individual conveyor segments are coupled with the tension element at points along its length. Connection is preferably at regular intervals, e.g. such that every third to tenth conveyor segment is connected in longitudinal force-transmitting manner to the tension element. This allows the forces which are required for overcoming the resistance to displacement to be distributed along the conveying line of the curve conveyor. It will be apparent that the coupling of the individual conveyor segments to the tension element should be made such that the transverse freedom of the tension element relative to the conveying line is not substantially hindered. For example, it may be by means of coupling elements which are connected, preferably by a pivotable connection, to the tension element and which can run via rollers or sliding elements laterally along a transverse member e.g. rod or the like of the relevant conveyor segment, in longitudinal force-transmitting manner. These transverse rods may be the wheel axles for running wheels with which the conveying line is supported for travelling movement.

In order to allow the curve conveyor to travel along curves in a controlled manner it is advantageous in use to provide in each curve region curve guide elements e.g. anchorable frame guides or the like, such as are known from DE-OS 37 27 272. The conveyor may have, at at least one of its two end regions, a magazine for the accommodation of a plurality of such curve guide units which can be used as and when needed, but otherwise can be carried along in the magazine during travel. Preferably the curve guide units consist of gantry-form guide frames which advantageously are clampable between roof and floor and for this purpose advantageously have props which can be extended towards the floor. The conveying line is preferably provided with a guideway along which the individual curve guide units can be guided from the magazine to the respective place of us and vice versa. In a particular simple arrangement, the curve guide units used are gantry-type frames which extend about the conveying line of the curve conveyor and bear on the guideway by means of running and/or guide wheels. The guideway can be formed of parts of the conveyor segments which project about the conveying channel e.g. upstanding side walls of the conveyor segments, which in this case form a supporting frame for the individual channel or run sections of the conveyor.

BRIEF DESCRIPTION OF THE DRAWINGS An embodiment of the invention is now described in detail with reference to the accompanying drawings, in which:

FIG. 1 is a plan view of a curve conveyor;

FIG. 2 is a side view of the curve conveyor of FIG. 1;

FIG. 3 is a plan view on a larger scale of the head end of the curve conveyor of FIGS. 1 and 2;

FIG. 4 is a side view of FIG. 3;

DETAILED DESCRIPTION OF THE PREFERRED EMBODIMENT

Figure 5:
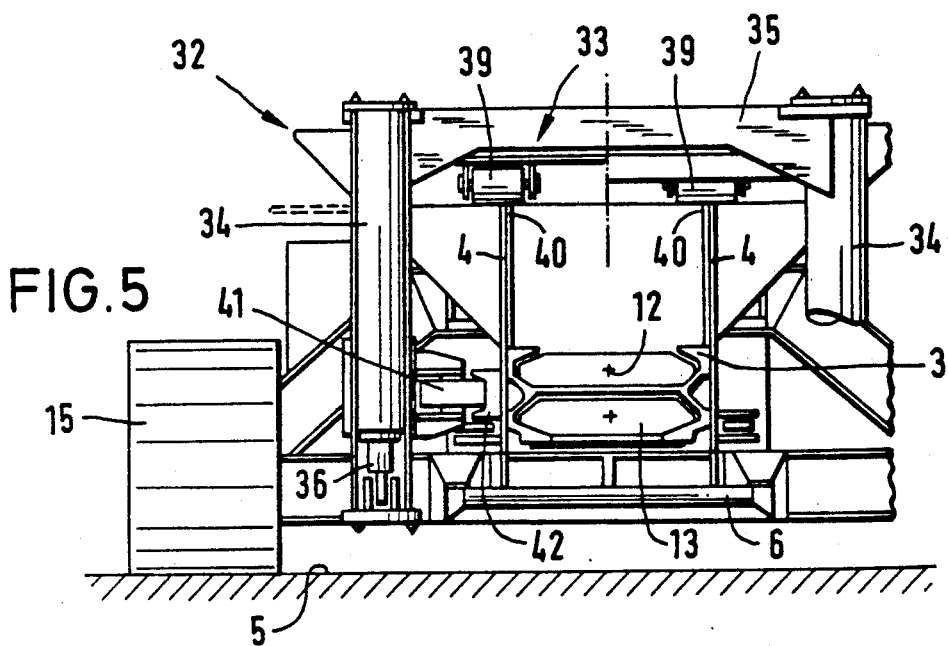
FIG. 5 shows the curve conveyor in a cross-section taken on the line V—V of FIG. 4.
Figure 6:
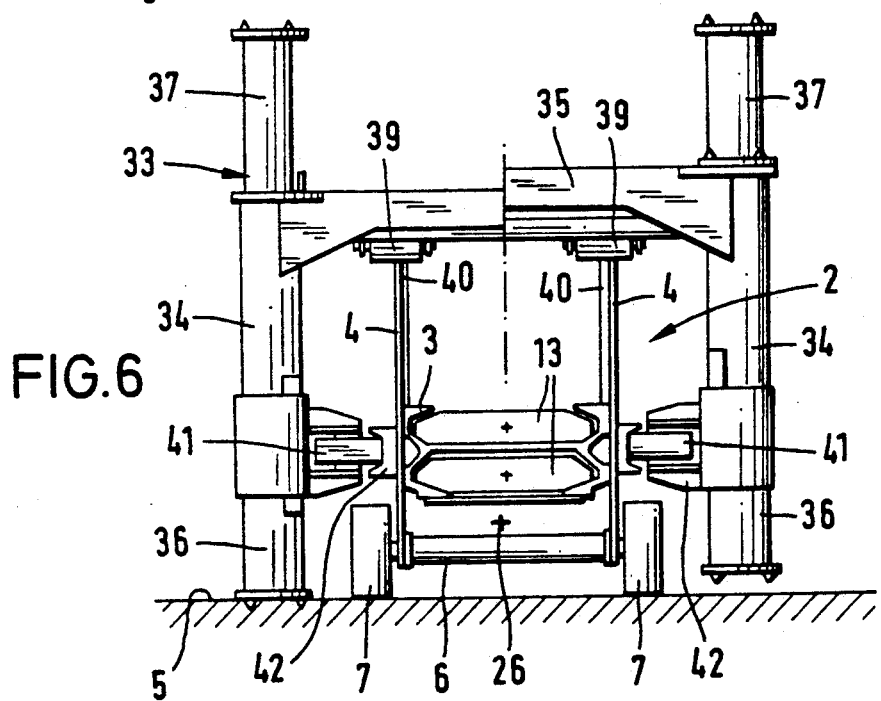
FIG. 6 shows the curve conveyor in a cross-section through its conveying line in a curve region, with a curve guide unit arranged thereat.

The curve conveyor shown in the drawings consists of a chain scraper conveyor which is capable of following a curved course and whose conveying line 1, providing the conveying channel, comprises a plurality of conveyor segments 2 arranged one behind the other in the direction of conveyance, each such segment accommodating a channel section 3. As shown in FIGS. 5 and 6, the conveyor segments 2 each provide a supporting frame for a channel section 3. The segments 2 comprise vertical side walls 4 between which the conveying channel 3 is interposed, at a spacing from the floor 5. At a spacing below the channel section 3 the side walls 4 are connected by a transverse rod 6 which can at the same time form the wheel axle for running wheels 7 with which the curve conveyor is supported for travelling on the floor 5 or on a track. As FIGS. 1 and 2 show, it is sufficient if e.g. each third conveyor segment 2 is provided with running wheels 7. The conveyor segments 2 or their channel sections 3 are connected in tension-resistant manner to one another, as is known, so as to be angularly movable relatively to on another in the horizontal plane and possibly also to a limited extent in the vertical place. This can be effected in known manner e.g. by means of screw bolts, toggle bolts, or the like. The conveyor segments 2 and accordingly the channel sections 3 have a relatively short axial overall length which is markedly smaller than their overall width. Therefore, they form a continuous conveying line constructed in the manner of a flat-link chain.

The conveying channel formed of the individual channel sections 3 ends at each end in a machine frame 8 and 9 in which, as is also known, a drive drum and a turn-round chain drum 10 and 11 respectively are mounted for driving and turning-round the endless band of scraper chain 12, which is fitted with scrapers 13 (FIGS. 5 and 6). The chain scraper conveyor is constructed in known manner as a central-chain scraper conveyor.

The machine frame 8 is situated at a head station 14 of the curve conveyor, which station is provided with crawler or caterpillar-track running gear 15 by means of which the entire curve conveyor can be displaced with directional guidance in its longitudinal direction as indicated by the arrow 16. It can be made to follow a winning machine (not shown) which delivers won material to the conveyor at the machine frame 8, whence the conveyor then conveys it to the rear machine frame 9 where it is discharged over the drive drum 11 on to a following conveyor apparatus. The two drives 17 for the chain drum 11 are attached at the sides of the machine frame 9. The chain drum 20 in the other machine frame 8 forms the return station or turn-round station for the endless scraper chain. It is also combined with the drive apparatus of the crawler running gear, to constitute an integral drive unit. As FIG. 3 shows, the drive apparatus comprises e.g. an electric motor 18, a pump 19 driven by the latter, and a container 20 for pressure fluid. The pump 19 supplies the hydraulic travelling drives and any other hydraulic power consuming apparatus.

A preloading device for tensioning the scraper chain 12, 13 is provided in the head-end machine frame 8. This device may be a per se known hydraulic preloading device with at least one hydraulic preloading cylinder by means of which the chain drum 10 can be adjusted in the preloading direction. The chain drum 10 is mounted with its shaft in bearing parts 21 which are guided, as FIG. 4 shows, in window-like apertures of the side plates of the machine frame 8, and on which hydraulic preloading cylinders 22 engage.

As mentioned, the curve conveyor discharges material at its rear end on to a downstream conveyor which, as FIG. 2 shows, comprises a belt 23 arranged in a belt framework 24 in the roadway, this framework being provided with rails 25. The curve conveyor is supported at its rear end region via running wheels 7 on the rails 25, with its discharge end above the belt 23. When the curve conveyor advances in the direction of the arrow 16 it bears on the floor 5 by means of its running wheels 7, except for the end region guided on the rails 25.

Figure 7:
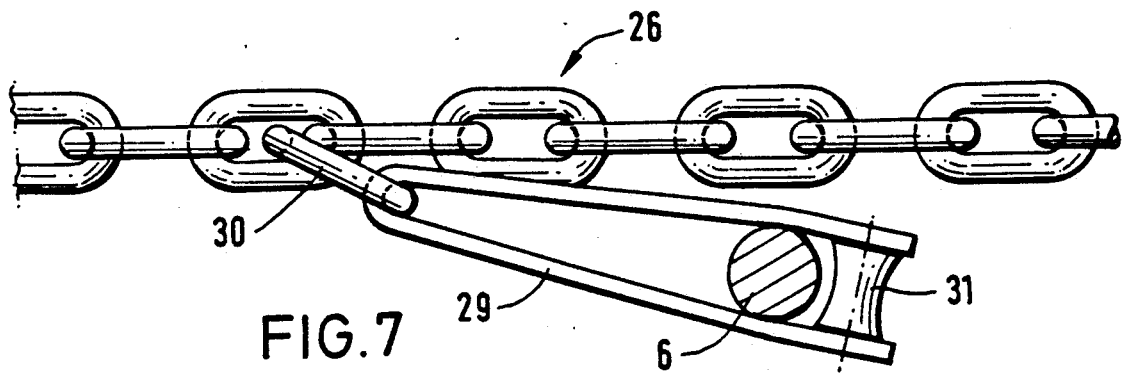
FIG. 7 shows a detail, namely the coupling of a conveyor segment to a draw chain.

FIG. 1 shows in particular a flexible tension element 26 extending over the length of the conveying line. One of its ends is attached at 27 to the machine frame 8 and its other end is attached at 29 to the machine frame 9. The tension element 26 consists preferably of a round-link chain (FIG. 7). It is taken along through between the side wall parts 4 of the conveying line 1, at a spacing below the conveying channel of the chain scraper conveyor, but above the transverse axles 6 as FIG. 6 shows. Accordingly the arrangement is made such that the tension element 26, which is coupled at 27, 28 respectively in force-transmitting manner to the two end regions of the chain scraper conveyor, is movable transversely to the conveying direction over the width of the conveying channel relative to the individual conveyor segments 2 of the conveying line, so that in curved regions of the conveying line 1 the said tension element is disposed at least approximately as a tangent to the inner arc of the curve. In FIG. 1 the conveying line 1 is shown following a substantially S-shaped curved course with two curves A and B. In the region of the curves A and B the tension element 26 extends approximately tangentially to the arc at the inner side of the curve, or in other words as a chord to the arc formed by the central axis of the conveyor. This arc corresponds to the arc course of the central scraper chain 12. At the apex of each of the curves A and B the tension element 26 bears on the side wall part 4 of the conveyor segment at the inner side of the curve, in fact at 26' (FIG. 1).

When the curve conveyor is bodily displaced by the crawler track running gear 15, the pulling force is transmitted via the tension element 26 to the rear end region i.e. to the machine frame 9, so that the curve conveyor is advanced at the same time by dragging of the rear end through the tension element 26. The transmission of force via the tension element 26 results in relief of load on the scraper chain 12, and also stabilises the curve conveyor on the particular curved course desired since, as mentioned, it can move freely sideways with respect to the conveyor segments 2 between the two side wall parts 4, and therefore can adjust itself to lie approximately tangentially to the inner curve arc at a curve. The side walls 4 or other side abutments limit the transverse movements of the tension element 26 relative to the conveyor segments 2.

The arrangement is preferably such that conveyor segments 2 along the conveyor line 1 are coupled at regular intervals in force-transmitting manner to the tension element 26. For example each second conveyor segment 2 can be coupled to the tension element 26, or as few as each tenth. An advantageous arrangement of such a coupling is shown in FIG. 7. A coupling element 29 transmits the pulling force of the chain and is connected pivotably to the draw chain 26 by means of a shackle 30 suspended in a link of the draw chain. The coupling element engages about the transverse rod 6 of the relevant conveyor segment 2. It comprises between two arms a bearing roller 31 with which it abuts against the transverse rod 6, thus producing a tension-resistant connection between the relevant conveyor segment and the draw chain 26 whilst retaining the possibility of transverse movement of the draw chain along the transverse rod 6. The pulling force introduced into the tension element 26 at the head station 14 by the travelling drive can in this way be distributed via the tension element 26 over any number of conveyor segments 2, so that an advantageous distribution of load is achievable. The length of the tension element 26 between its two end attachment points 27 and 28 is advantageously approximately so adjusted that it is not greater than, or not substantially greater than, the length of conveying line bridged by the tension element when the conveying line is on a straight course with the channel sections 3 butting fully on one another. Setting the length of the tension element 26 in this way allows the curve conveyor to negotiate the desired curves. Conveying work can be continued with during travel of the curve conveyor.

To enable curves to be negotiated by the curve conveyor in a more organized manner, curve guide units are used which can be anchored at the place of use roughly at the apex of a curve which is to be travelled through. As FIGS. 2 to 5 show especially, the curve conveyor is provided with a magazine 32 which can accommodate a plurality of curve guide elements or units 33. The magazine 32 is situated at the head station, immediately behind the machine frame 8 of the chain scraper conveyor. The curve guide units 33 are gantry-type guide frames which, as can be seen from FIGS. 5 and 6, each comprise two vertical props 34 connected above the curve conveyor by means of a cross-member 35. The gantry-frame thus extends in U-form manner about the curve conveyor. The two anchoring props 34 have feet 36 which can be extended hydraulically to the floor 5, and prop heads 37 which can be extended hydraulically to the roof 38. Mounted on the cross-member 35 are running wheels 39 with which the guide frame 33 bears, with rolling contact, from above on the upstanding side wall parts 4. The upper ends of the side wall parts 4 of the conveyor segments 2 form upper guideways 40 extending all along the conveying line, for supporting and guiding the guide frames 33. The latter have on their props 34 lateral guide wheels 41 with which they guide themselves on guide rails 42 on the outer sides of the side walls 4. The gantry-type guide frames 33 can therefore be run from their position within the magazine 32 over the upper guideway 40 in the longitudinal direction of the conveying line 1 to a selected position, where they are anchored between roof and floor by hydraulic extension of the props 34. In the region of the curve which the curve conveyor has to negotiate they thus form a stationary curve guide, guiding the conveying line along the curve or rather vice versa. The position of a curve guide unit 33 is shown in the region of the curve A in FIG. 1. A corresponding curve guide unit 33 may also be provided in the region of the curve B; this is not specifically shown in FIG. 1. The side guide wheels 41, which bear on the lateral guide rails 42, ensure lateral stability of the guide frames 33 during their movements along the curve conveyor. When the guide frames are anchored, their guide wheels 41 then effect the lateral guiding of the curve conveyor as it runs through them, diverting along the desired curve.

What is claimed is:

1. A curvable scraper chain conveyor which is bodily movable in a longitudinal direction thereof, comprising:
   a conveyor line having ends the one of which forms a head end and the other of which forms a tail end of said curvable scraper chain conveyor, the conveyor line comprising a plurality of conveyor line segments articulated together to allow curving of the conveyor line;
   a material transfer conveying run along the conveyor line formed by channel sections of said conveyor segments;
   a scraper chain drivable along the conveying run for causing transfer of material therein;
   machine frames at the head and tail end of the conveyor line for driving and forming round the scraper chain by sprockets amounted in said machine frames;
   a tension element extending along the conveyor line between the ends thereof and secured at the ends in a force-transmitting manner to transfer the traction force from the head end to the tail end of the curvable scraper chain conveyor if the same is moved in its longitudinal direction;
   said tension element having lateral freedom of movement relative to the conveyor line between the ends thereof so that on curving of the conveyor line to form at least one curved portion therein the tension element extends at least approximately as a tangent to an inner curved arc formed by said curved portion; and,
   abutment means on the conveyor line for limiting the lateral freedom of movement of the tension element.

2. A curvable conveyor as claimed in claim 1 in which the tension element is a chain.

3. A curvable conveyor as claimed in claim 2 in which the tension element is a rounded-link chain.

4. A curvable conveyor as claim in claim 1 in which the tension element is secured to the machine frames at the head and tail end of the conveyor line.

5. A curvable conveyor as claimed in claim 1 in which the tension element extends along the conveyor line at a spacing below the conveying run.

6. A curvable conveyor as claimed in claim 1 in which some of the conveyor segments are coupled segments, the coupled segments being coupled directly to the tension element.

7. A curvable conveyor as claimed in claim 6 in which the coupled segments being coupled directly to the tension element comprise a transverse part, and a coupling element which couples the tension element to the transverse part so as to be laterally movable therealong.

8. A curvable conveyor as claimed in claim 1, in which a said machine frame comprises a drive unit for causing bodily translational movement of the conveyor in its longitudinal direction.

9. A curvable conveyor as claimed in claim 1 in which the drive unit comprises powered caterpillar tracks.

10. A curvable conveyor as claimed in claim 1 in which the conveyor line when aligned straight is at least nearly as long as the tension element connected over that length of the conveyor line.

11. A curvable conveyor as claimed in claim 1 in which at least some of the conveyor line segments comprise running wheels.

12. A curvable conveyor as claimed in claim 11 in which said at least some of the conveyor line segments comprise transverse axles, the transverse axles bearing the running wheels and being coupled to the tension element.

13. A curvable conveyor as claimed in claim 1 in which conveyor line segments comprise side walls, and transverse parts extending between the side walls and spaced below the conveying run, the tension element running between the side walls and between the run and transverse parts.

14. A curvable conveyor as claimed in claim 1, further comprising means for tensioning the scraper chain.

15. A curvable conveyor as claimed in claim 1, further comprising at at least one end a magazine of curve guide elements, the curve guide elements being positionable along the conveyor line.

16. A curvable conveyor a claimed in claim 15 in which the curve guide elements are gantry frames.

17. A curvable conveyor as claimed in claim 15 in which the curve guide elements have runners and the conveyor line has a guideway for the curve guide element runners to run on.

18. An improved curvable scraper chain conveyor of the type which is bodily movable on wheels in its longitudinal direction, and has a multi-segmented curvable conveyor line with a scraper chain drivable in a conveying channel along a median line thereof, wherein the improvement comprises a long flexible tension element extending along the conveyor line, the tension element being longitudinally secured at the ends of the conveyor line to transmit towing forces therebetween, and having lateral freedom of movement across substantially the width of the conveyor line so that upon curving thereof to form at least one curved portion therein the tension element can extend substantially as a tangent to an inner curved arc formed by said curved portion 19. An improved conveyor as claimed in claim 18 in which the tension element is a round-link chain.

20. A curvable chain scraper conveyor which is bodily movable in a longitudinal direction thereof, comprising:
   a conveyor line having ends, the conveyor lines comprising a plurality of segments articulated together to allow curving of the conveyor line;
   a material transfer conveying run along the conveyor line;
   a scraper chain drivable along in the conveying run, for causing transfer of material therein;
   machine frames at the ends of the conveyor line;
   a tension element extending along the conveyor line between the ends thereof and secured at the ends, the tension element having lateral freedom of movement relative to the conveyor line between the ends, and
   abutment means on the conveyor line for limiting the lateral freedom of movement of the tension element;
   whereby on curving of the conveyor line the tension element lies as a tangent to the inside of the curve relative to said segments; and
   at at least one end a magazine of curved guide elements, the curve guide elements being positionable along the conveyor line.

21. A curvable conveyor as claimed in claim 20 in which the curve guide elements are gantry frames.

22. A curvable conveyor as claimed in claim 21 in which the curve guide elements have runners and the conveyor line has a guideway for the curve guide element runners to run on.

* * * * *